United States Patent
Erlenbach et al.

(10) Patent No.: US 8,078,114 B2
(45) Date of Patent: *Dec. 13, 2011

(54) METHOD AND APPARATUS FOR DETERMINING PROPAGATION DELAYS FOR USE IN WIDE AREA NETWORKS

(75) Inventors: Judd Erlenbach, San Diego, CA (US); Franklin J. Gutterman, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/042,127

(22) Filed: Mar. 4, 2008

(65) Prior Publication Data
US 2008/0212565 A1 Sep. 4, 2008

Related U.S. Application Data

(63) Continuation of application No. 10/357,834, filed on Feb. 3, 2003, now Pat. No. 7,363,009.

(51) Int. Cl.
*H04B 17/00* (2006.01)
*H04B 15/00* (2006.01)
(52) U.S. Cl. .............. 455/67.11; 455/67.14; 455/67.16; 455/502
(58) Field of Classification Search ............... 455/67.11, 455/67.14, 67.16, 404.2, 3.02, 502; 370/350
See application file for complete search history.

(56) References Cited

U.S. PATENT DOCUMENTS

| 5,657,313 | A | 8/1997 | Takahashi et al. |
| 5,703,873 | A | 12/1997 | Ojanpera et al. |
| 6,192,247 | B1 | 2/2001 | Dillon et al. |
| 7,363,009 | B2 * | 4/2008 | Erlenbach et al. ......... 455/67.11 |

FOREIGN PATENT DOCUMENTS

GB 2359960 6/2004

OTHER PUBLICATIONS

International Search Report and Written Opinion—PCT/US2004/003213, International Search Authority—European Patent Office—Feb. 28, 2005.

* cited by examiner

*Primary Examiner* — Eugene Yun
(74) *Attorney, Agent, or Firm* — Gerald P. Joyce, III

(57) ABSTRACT

A system and method for determining a signal propagation delay between a transmitter and a receiver, and for adjusting a transmission time based on the propagation delay. A central station inserts a marker into a transmitted signal at a time corresponding to a received timing signal. The MCT receives the signal from the central station and determines a time difference between receipt of the marker and the detection of the time interval event. A transmission by the MCT is adjusted by an amount of time proportional to the time difference.

12 Claims, 4 Drawing Sheets

METHOD AND APPARATUS FOR DETERMINING PROPAGATION DELAYS FOR USE IN WIDE AREA NETWORKS

RELATED APPLICATIONS

This application is a continuation of and claims priority to U.S. patent application titled "Method and Apparatus for Determining Propagation Delays for Use in Wide Area Networks", Ser. No. 10/357,834, filed Feb. 3, 2003 now U.S. Pat. No. 7,363,009 which is assigned to the assignee hereof and is incorporated herein by reference in its entirety.

BACKGROUND OF THE INVENTION

I. Field of the Invention

The invention relates to wireless communications and, in particular, to determining a propagation delay between a transmitter and a receiver.

II. Description of the Related Art

In wireless communication networks, the signal transmission propagation delay between a transmitter and a receiver may vary greatly. When such units communicate randomly in these networks, signal detection/synchronization may be difficult, requiring a receiver to search over a wide range of frequencies, times, codes, etc. and employ significant resources to complete random signal reception synchronization. Additionally, significant link overhead is required to enable successful demodulation. A need thus exists for a method and apparatus that reduces the random signal detection synchronization complexity.

SUMMARY OF THE INVENTION

The present invention comprises methods and apparatus for determining a signal propagation delay between a transmitter and a receiver. In one embodiment, an apparatus comprises means for detecting a time interval event, means for receiving a first signal, the first signal comprising a marker, and means for determining a time difference between the time interval event and the marker. The apparatus may further comprise means for adjusting a transmission time of a second signal based on the time difference.

In another embodiment, the present invention comprises a method, the method comprising detecting a time interval event, receiving a first signal, the first signal comprising a marker; and determining a time difference between the time interval event and the marker. The method may further comprise adjusting a transmission time of a second signal based on the time difference.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
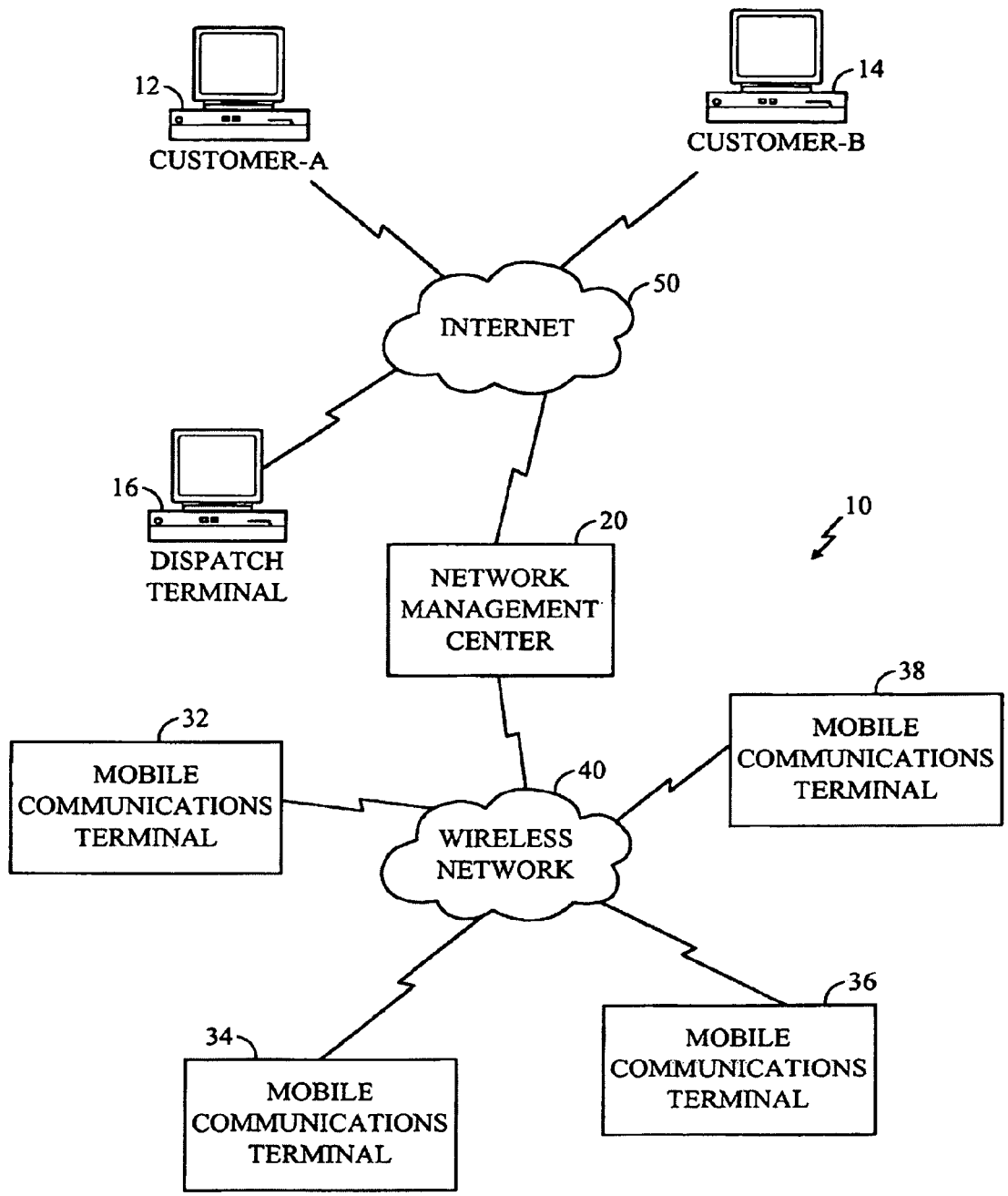
FIG. 1 is an illustration of mobile communication system architecture in which the present invention may be employed.

FIG. 1 is a block diagram of an exemplary wide area network, in particular, a mobile communications architecture 10 in which the present invention may be employed. The architecture 10 includes a network management center ("NMC") system 20 coupled to a plurality of terrestrial mobile communication terminals ("MCT") 32, 34, 36, and 38 via a wireless network 40. The wireless network 40 may comprise a satellite network, cellular telephone network, or other wireless voice and/or data communication network. An MCT may be mounted in a vehicle or be part of a mobile device optimally geographically located within the operational boundaries of the wireless network 40.

The NMC 20 acts as a central routing station for communications between MCTs and one or more customers, shown in FIG. 1 as customer-A 12, customer-B 14, and dispatch terminal 16. The NMC 20 may be coupled to the customer systems 12, 14 and dispatch station 16 by dialup connection, Internet connection 50, or direct connection (local area network), or other suitable communication system including a wireless communication system. The NMC 20 may be coupled to the wireless communication network 40 via plain old telephone service (POTS), via a data network such as the Internet, through dedicated communication lines such as a T1 or T3 line, or wirelessly. In another embodiment, the NMC 20 is co-located with at least a portion of the wireless communication network 40. For example, NMC 20 could be co-located with a satellite earth transmission/reception station. The communication link between the NMC 20 to MCTs is commonly referred to as a forward link, while signals from MCTs to the NMC 20 are sent on a reverse link. Where a MCT is located within a vehicle, data communicated on the forward link may include geographical location information, delivery and vehicle status, encoded voice communications from a MCT and directions, instructions, road status information, and voice communications from the NMC 20. The NMC 20 may receive similar information from a MCT and forward the information to a customer (12, 14) and/or dispatcher (via dispatch terminal 16).

Figure 2:
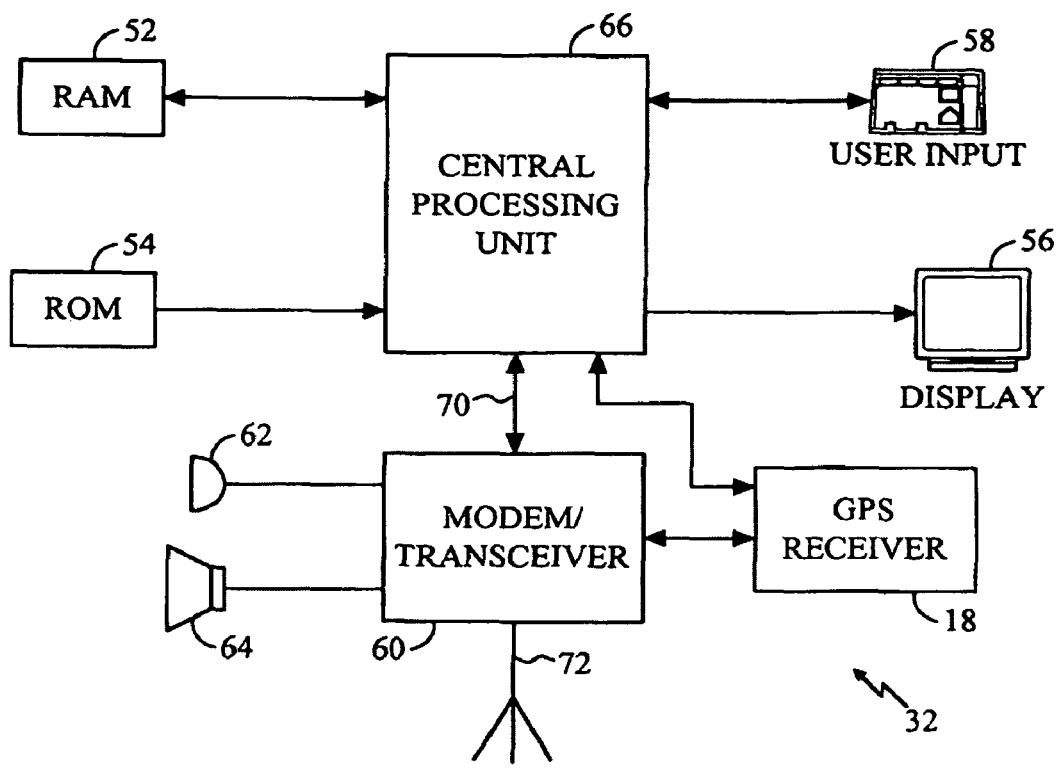
FIG. 2 illustrates a mobile communications terminal ("MCT") in accordance with the present invention in functional block diagram format that may be employed in the architecture shown in FIG. 1.

A block diagram of an exemplary MCT 32, 34, 36, or 38 is shown in FIG. 2. The MCT 32 includes a central processing unit ("CPU") 66, a random access memory ("RAM") 52, a read only memory ("ROM") 54, a display 56, a user input device 58, a transceiver 60, a microphone 62, a speaker 64, a GPS receiver 18, and an antenna 72. The ROM 54 is coupled to the CPU 66 and stores the program instructions to be executed by the CPU 66. The RAM 52 is also coupled to the CPU 66 and stores temporary program data. The user-input device 58 may include a keypad, a touch pad screen, a track ball, or other input device. The user employs the input device 58 to navigate through menus, to generate messages, request route information, and other functions. The display 56 is an output device such as a CRT, a LCD, or other user perceptible device. The user may employ the display 56 to read decoded messages or other data transmitted from a customer 12 or 14 or other unit (MCT 32) via the wireless network 40. The CPU 66 may comprise an Intel™ 80186, ARM 946, or other suitable processor.

When provided, the microphone 62 and speaker 64 may be incorporated in a handset coupled to the transceiver 60. The microphone 62 and speaker 64 may also be more physically separated to enable hands free communication with the user of the MCT 32. In this mode, the transceiver 60 may include voice activation circuitry that may convert voice into data transmitted to the CPU 66 for processing. The data is transmitted to CPU 66 via a serial bus 70. The transceiver 60 includes the instruction set necessary to communicate data and voice signals over the wireless communication network 40. In one embodiment, the transceiver 60 supports code division multiple access ("CDMA") protocols and the wireless network is a CDMA based network that supports data and voice signals. The transceiver 60 is coupled to the antenna 72 for communicating signals with the wireless communication network 40. When a data signal is received by the transceiver 60, the data is transferred to the CPU 66 via the serial bus 70. The data may include text messages, traffic updates, suggested changes to road navigation, destination, multiple destination order priority, weather, accident, construction or other road network status data, or other information. The data may also include software updates for the unit. The transceiver 60 may be capable of receiving position and velocity vectors signals from one or more of a variety of position-location systems that are known in the art . . . . In one embodiment, the CPU 66 may also direct the transceiver 60 to receive a global positioning signal ("GPS") from a satellite and decode the GPS to extract position and timing information.

Figure 3:
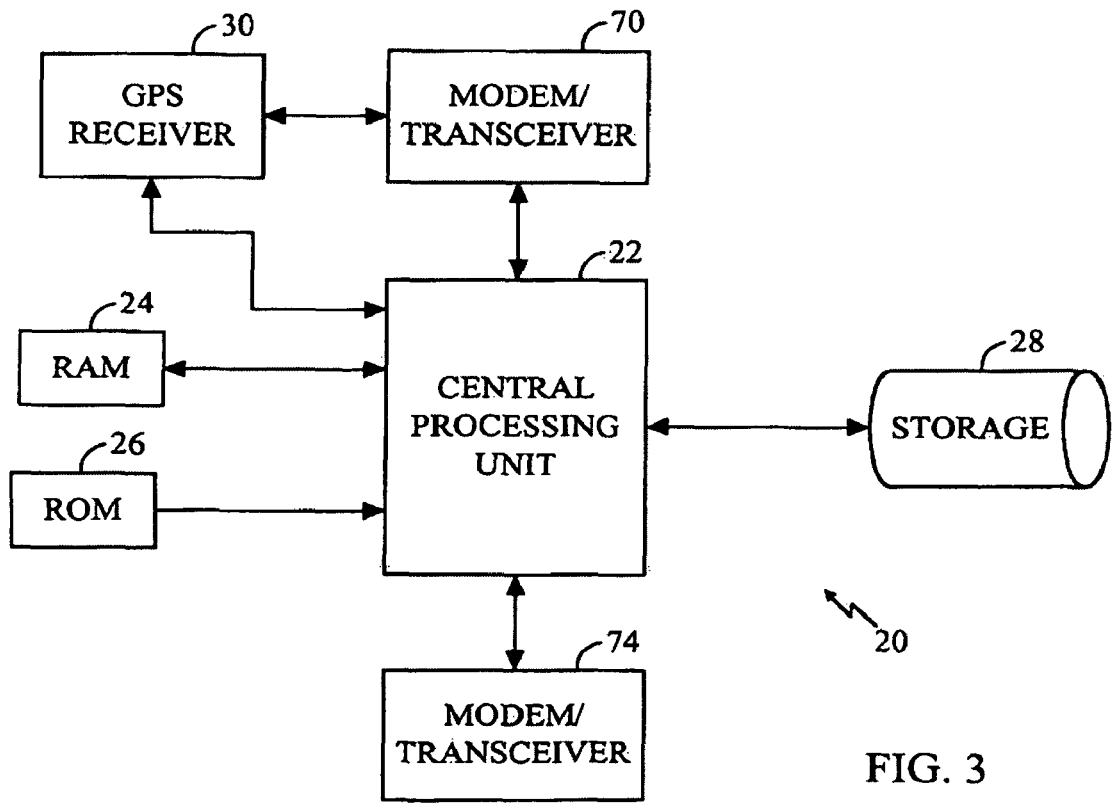
FIG. 3 illustrates a network management center ("NMC") system of the present invention in functional block diagram format that may be employed in the architecture shown in FIG. 1.

A block diagram of a typical NMC 20 is shown in FIG. 3. The NMC 20 includes a CPU 22, a RAM 24, a ROM 26, a storage unit 28, a first modem/transceiver 70, a GPS receiver 30, and a second modem/transceiver 74. The first modem/transceiver 70 may couple the NMC 20 to internet 50. The modem/transceiver 70 may be an Ethernet modem connecting the NMC 20 to a local network or Internet. The second modem/transceiver 74 couples the NMC 20 to the wireless communication network 40 and allows bi-directional communication with one or more MCTs. The CPU 22 may direct communications between the first and second modem 70 and 74 for messages between the customer terminals 12, 14 and dispatch terminal 16 and one or more MCTs 32, 34, 36 and 38. The ROM 26 may store program instructions to be executed by the CPU 22 to perform the above and below described operations. The RAM 24 may be used to store temporary program information, received data, and message. The storage unit 28 may be any unit capable of data storage and may be used to store messages and other information.

Occasionally, an MCT 32, 34, 36, 38 may desire to send a message to the NMC 20. To prevent or limit simultaneous message transmission or interference, architecture 10 employs a polling protocol. In this protocol, the NMC 20 periodically sends a polling message to the MCT 32, 34, 36, and 38, which queries an MCT as to whether or not it has a message to send back to the NMC 20. When an MCT has a message to send, it waits to receive a polling message and then responds with a "request to send" message at a particular time based on the polling message. The "request to send" message indicates that MCT 32 desires to transmit a message to the NMC 20. The NMC 20 receives the "request to send" message and in response, issues a grant to the MCT 32. The grant gives permission for the requesting MCT to send the message, and typically comprises other information, such as when to transmit the message, or on what frequency to transmit the message. The MCT may then send the message based on the information contained in the grant.

When the NMC 20 sends the polling message, several MCTs 32, 34, 36, and 38 may respond. It is noted that the "request to send" message sent by the MCT typically begins with a preamble that is recognized by NMC 20. The preamble is used to allow the NMC 20 to detect the "request to send" message, as well as other messages, and to achieve timing and frequency synchronization, which is used to demodulate these messages. The propagation delay varies among MCTs due to their typically varying distances from NMC 20. Without the knowledge of the propagation delay for each MCT, the NMC 20 must search any received signals within the possible propagation delay uncertainty range in the whole network. This requires much processing power at the NMC 20 and/or a long preamble to facilitate the search process. The present invention enables each MCT to measure its propagation delay to the NMC 20 and pre-correct its transmit timing to account for the propagation delay such that signals transmitted from each MCT arrives at the NMC 20 at a time expected by the NMC. Since the uncertainty of the signal arrival time is greatly reduced, the required search effort is likewise reduced. This solution allows less complex hardware/processing power at the NMC 20 and/or allows a short preamble, thus increasing the system capacity since the time saved from shortening the preamble can be used to transmit useful information. Other benefits include reducing the chance of message collision and interference.

Figure 4A:
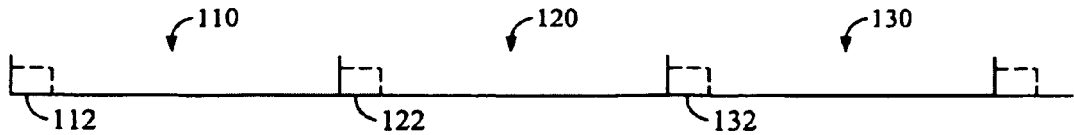
FIGS. 4A to 4B are illustrations of transmission time slots including tracking data that may be employed in an embodiment of the present invention.
Figure 4B:
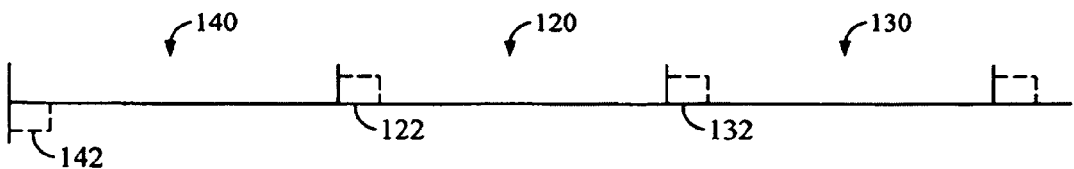

FIGS. 4A and 4B are illustrations of forward link transmission time slots, including tracking data (e.g. pilot bursts, described later herein), that are used to determine the propagation time between a transmitter and a receiver. In this exemplary embodiment, data is transmitted in time slots, each time slot comprising 1.67 milliseconds for a total of 600 time slots per second. Shown in FIG. 4a are three of such time slots 110, 120, and 130. Each time slot comprises 4096 chips of which 384 chips at the start of each time slot (i.e., a pilot burst) is used for tracking data. Of course, there are numerous other combinations of time slot configurations possible.

In one embodiment, the tracking data comprises a pilot signal, pilot burst, or pilot data, $Pl_k$ where k represents the slot number. The NMC 20 generates the tracking data and an MCT uses the tracking data to lock the transmission frequency and time and ultimately demodulate the NMC signal. In one exemplary embodiment, the NMC 20 inserts a time marker, or simply "marker", into the pilot signal by inverting the pilot signal (pilot signal 142 shown in FIG. 4B) on a periodic basis and time point know by each MCT. In one exemplary embodiment, the NMC 20 inverts the pilot signal at a time corresponding to a local GPS timing signal that is received by GPS receiver 30. Specifically, a pilot signal is inverted upon the detection of a one pulse-per-second (PPS) signal of a GPS timing signal. Therefore, the pilot signal is inverted once per second upon the detection of the one PPS signal. Of course, the marker may comprise other signals other than an inverted pilot signal, such as a known sequence of data that is recognized by MCTs. In addition, the marker may be inserted by NMC 20 based on any other timing signal that is common to both the NMC 20 and an MCT.

In an embodiment where GPS timing signals are used, each MCT 32, 34, 36, and 38 receives the same GPS timing signal as the NMC 20 using GPS receiver 18. In this embodiment, an MCT starts a counter upon receipt of the one PPS GPS timing signal and stops the counter upon receipt of a time slot containing an inverted pilot. The one way signal propagation delay between NMC 20 and an MCT may then be approximately determined based on the count. An MCT may then adjust a message transmission timing based on the determined one way signal propagation delay.

Figure 5A:
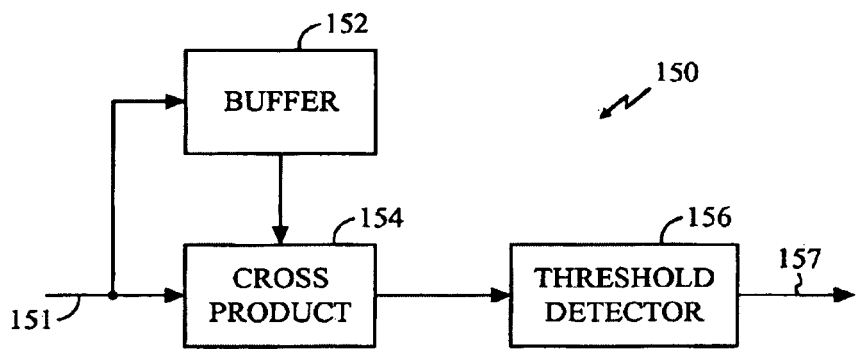
FIG. 5A is a functional block diagram of an inverse pilot detection apparatus in accordance with an embodiment of the present invention.

FIG. 5A is a functional block diagram of an inverse pilot detection apparatus 150 in accordance with an embodiment of the present invention that may be employed by an MCT. The exemplary inverse pilot detector 150 includes a multiple pilot burst buffer 152, cross product calculator 154, and threshold detector 156. In this exemplary embodiment, the cross product calculator 154 determines a dot product D(n) where $D(n)=PL_k \cdot [PL_{k-1}+PL_{k-2}]$. When a slot includes an inverted pilot, D(n) is negative, otherwise when a slot does not include an inverted pilot, D(n) is positive or equal to zero. The threshold detector 156 sets an inverted pilot flag 157 when D(n) is negative.

Figure 5B:
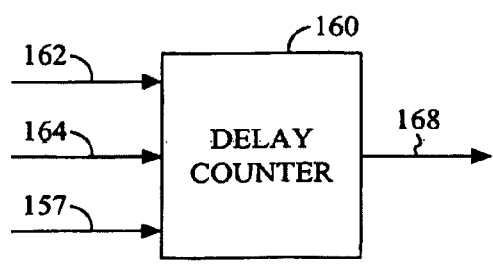
FIG. 5B is a functional block diagram of a propagation delay counter apparatus in accordance with an embodiment of the present invention.

FIG. 5B is a functional block diagram of a propagation delay counter 160 in accordance with an embodiment of the present invention. The counter 160 receives a timing signal 164 (i.e., the one PPS GPS timing signal), chip clock signal 162, and the inverted pilot flag 157. For each timing signal 164, the counter resets and starts counting the chip clock signal 162 (2.4576 Mchips/sec) until the inverted pilot flag 157 is set. The approximate propagation delay between the NMC 20 and the MCT is obtained by multiplying the count of counter 160 by the period of chip clock signal 162. The MCT may adjust the count based on the local oscillator (that produces the chip clock signal) error (if know or calculated). As noted, NMC 20 may assign a slot or time period when an MCT may transmit a message. The MCT may adjust this transmission time based on the determined propagation delay to reduce slot boundary violations.

Figure 6A:
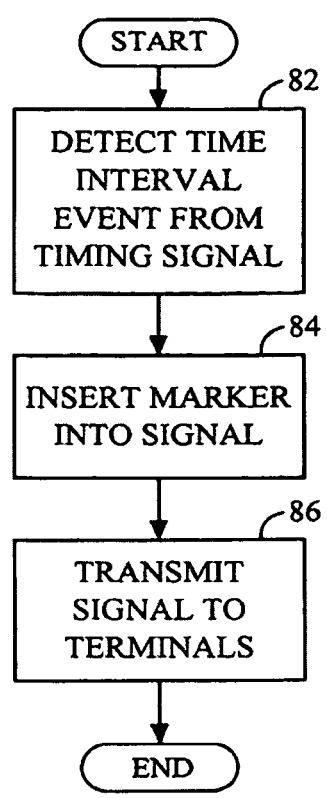
FIG. 6A illustrates a flow diagram for inserting a marker into a signal in accordance with an embodiment of the present invention.

FIG. 6A illustrates a method 80 for inserting a marker into a signal in accordance with an embodiment of the present invention that may be employed by the NMC 20. The method 80 detects a time-interval event from a timing signal (step 82). In one exemplary embodiment, the NMC 20 detects the 1 PPS signal from a received GPS timing signal. A marker is then inserted into a signal (step 84). In one exemplary embodiment, the NMC 20 inverts a pilot signal at a time corresponding to the 1 PPS signal. Next, the signal (including the marker) is transmitted to one or more MCTs (step 86).

Figure 6B:
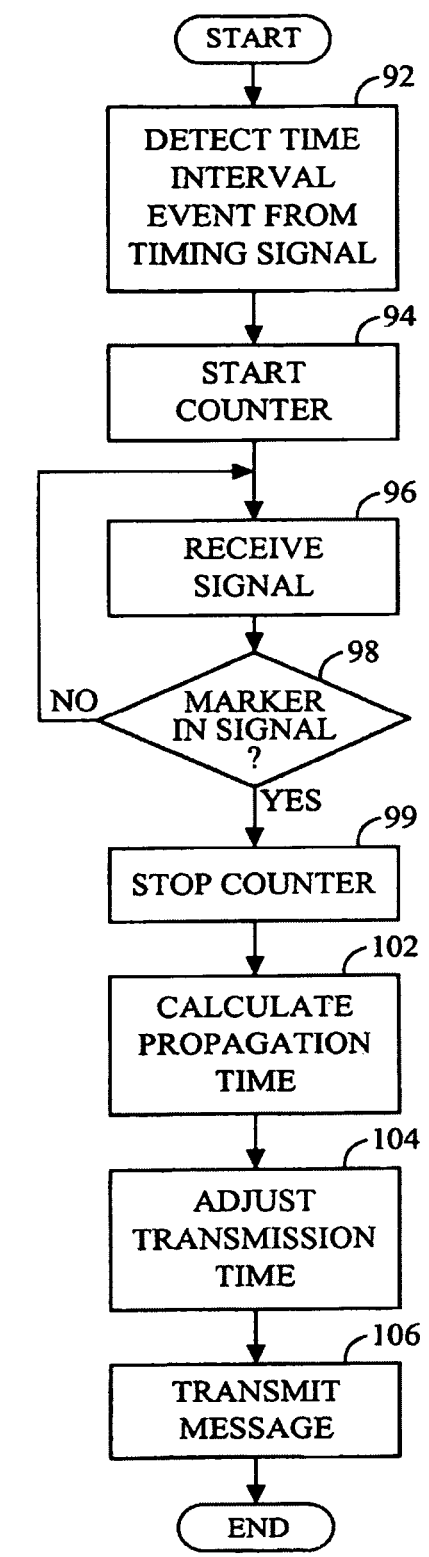
FIG. 6B illustrates a flow diagram for determining a signal propagation delay based a received propagation delay marker in accordance with an embodiment of the present invention and for adjusting a signal transmission based on the determined propagation delay.

FIG. 6B illustrates a method 90 for determining a propagation time between NMC 20 and an MCT, and further for adjusting a transmission time based on the propagation time. The method 90 detects a time interval event from a timing signal (step 92). In one exemplary embodiment, an MCT detects the 1 PPS signal from a received GPS timing signal. The method then starts/resets counter 160 (step 94). The method then looks for the marker in a received signal (steps 96 and 98). In an exemplary embodiment, an MCT detects the inverted pilot in the NMC signal. When the marker is detected, the counter is stopped (step 99). The MCT stops the counter when the inverted pilot is detected. Based on the count from counter 160, the propagation time between the NMC 20 and the MCT can be easily calculated (step 102). The MCT transmission time is then adjusted to account for the propagation delay (step 104). The MCT then transmits a signal based on the adjusted timing. In this way, the signal transmitted by the MCT arrives at the NMC 20 at a time that is expected by the NMC 20, thereby negating the effects of propagation delay and allowing the NMC 20 to more easily acquire the signal transmitted by the MCT.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

We claim:

1. An apparatus for determining a propagation delay between a mobile communications terminal (MCT) and a network management center (NMC), comprising:
   means for receiving a response from said NMC to a request by said MCT to transmit a message to said NMC at an expected time;
   means for receiving a first signal from said NMC;
   means for detecting an inverted pilot signal, which is inverted relative to a GPS timing signal, sent from said NMC, over a time interval during which said GPS timing signal is commonly received by said MCT and said NMC;
   means for determining a signal propagation delay offset from a time difference between receipt of the commonly received GPS timing signal and receipt of the inverted pilot signal; and
   means for transmitting said message from said MCT to said NMC at a time adjusted for said propagation delay offset to ensure receipt by said NMC at said expected time.

2. The apparatus of claim 1 wherein said GPS timing signal comprises a one pulse-per-second signal from a global positioning satellite timing signal.

3. The apparatus of claim 1, wherein the inverted pilot signal is inserted into the first signal at a time relative to the time interval.

4. The apparatus of claim 1, wherein the means for determining a signal propagation delay offset from a time difference between receipt of the commonly received GPS timing signal and receipt of the inverted pilot signal includes:
   means for starting a counter upon detection of the GPS timing signal;
   means for stopping the counter upon receipt of the inverted pilot signal; and
   means for determining the signal propagation delay based on a count of the counter when stopped.

5. A non-transitory computer-readable medium comprising program instructions which are computer-executable to implement a method
   for determining a propagation delay between a mobile communications terminal (MCT) and a network management center (NMC), the method comprising:

receiving a response from said NMC to a request by said MCT to transmit a message to said NMC at an expected time;

receiving a first signal from said NMC;

detecting an inverted pilot signal which is inverted relative to a GPS timing signal, sent from said NMC, over a time interval during which said GPS timing signal is commonly received by said MCT and said NMC;

determining a signal propagation delay offset from a time difference between receipt of the commonly received GPS timing signal and receipt of the inverted pilot signal; and transmitting said message from said MCT to said NMC at a time adjusted for said propagation delay offset to ensure receipt by said NMC at said expected time.

6. The non-transitory computer-readable medium of claim 5, wherein said GPS timing signal comprises a one pulse-per-second signal from a global positioning satellite timing signal.

7. The non-transitory computer-readable medium of claim 5, wherein the inverted pilot signal is inserted into the first signal at a time relative to the time interval.

8. The non-transitory computer-readable medium of claim 5, wherein the method for determining a propagation delay between a mobile communications terminal (MCT) and a network management center (NMC) further comprises:

starting a counter upon detection of the GPS timing signal;

stopping the counter upon receipt of the inverted pilot signal; and determining the signal propagation delay based on a count of the counter when stopped.

9. A mobile communications terminal (MCT) comprising:

a GPS receiver that receives a GPS timing signal;

a transceiver that receives signals from a network management center (NMC), the signals including a message indicating a time at which the MCT is to transmit a message to the NMC;

a processing unit that detects an pilot signal inverted relative to a GPS timing signal in the signals from the NMC and determines a signal propagation delay offset from a time difference between receipt of the GPS timing signal and receipt of the inverted pilot signal; and wherein the processing unit causes the transceiver to transmit a message to said NMC at a time adjusted for said propagation delay offset to ensure receipt by said NMC at said expected time.

10. The MCT of claim 9 wherein said GPS timing signal comprises a one pulse-per-second signal from a global positioning satellite timing signal.

11. The MCT of claim 9, wherein the pilot signal is inserted into the first signal at a time relative to the time interval.

12. The MCT of claim 9, wherein the processor determines the signal propagation delay offset by starting a counter upon detection of the GPS timing signal, stopping the counter upon receipt of the inverted pilot signal, and determining the signal propagation delay based on a-count of the counter when stopped.

* * * * *